Jan. 21, 1941.  H. E. VAN VOORHEES  2,229,615
LID SUPPORT
Filed Dec. 9, 1938
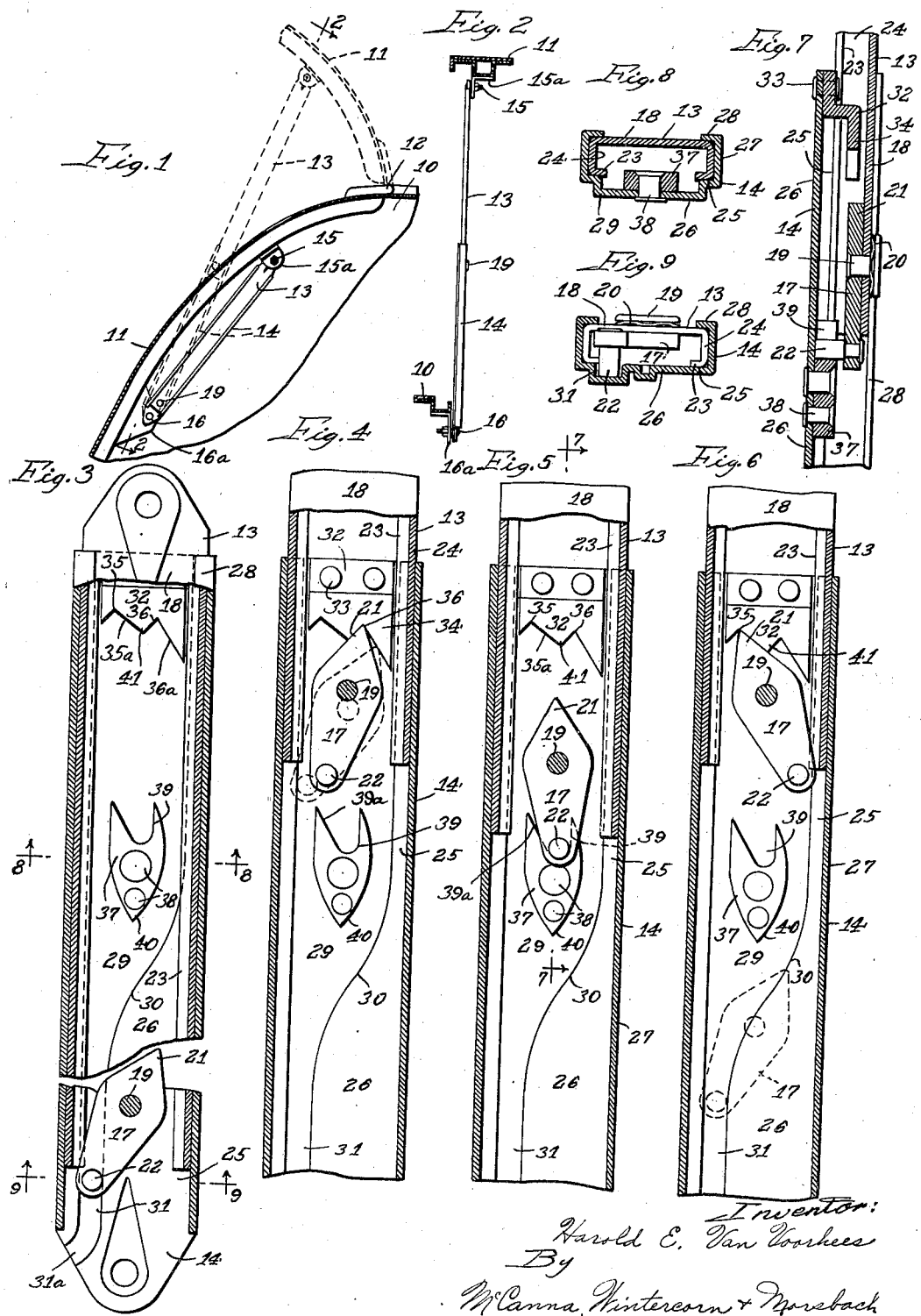
Inventor:
Harold E. Van Voorhees
By
McCanna, Wintercorn & Morsbach
Attys.

Patented Jan. 21, 1941

2,229,615

UNITED STATES PATENT OFFICE 2,229,615

LID SUPPORT

Harold E. Van Voorhees, Detroit, Mich., assignor to The Atwood Vacuum Machine Company, Rockford, Ill., a copartnership composed of Seth B. Atwood and James T. Atwood Application December 9, 1938, Serial No. 244,751

10 Claims. (Cl. 217—60)

This invention relates to supports for liftable hinged closures, and has particular reference to a new and improved support for the lid of a luggage compartment on an automobile or other vehicle.

I am aware that various pawl and ratchet escapement mechanisms have been applied to folding and telescoping types of lid supports but most of them have been objectionable from the standpoint that they were too costly to manufacture and were not positive enough in operation, many of them being so designed that the slightest irregularity in the form or relationship of the pawl and ratchet parts which the quantity production manufacture can hardly avoid, resulted either in uncertain operation if not actual failure. Then, too, many of the other designs with which I am familiar necessitate the exercise of more than ordinary care in the installation of the lid supports and the unsatisfactory operation of many of those devices is directly traceable to the assemblyman on the line at the automobile plant. It is, therefore, the principal object of my invention to provide a telescoping type lid support embodying a simplified pawl and ratchet escapement mechanism which has a smoother action and is more positive in operation than the mechanisms provided in other supports and which will not be apt to be thrown out of commission by the work of the assemblyman in installing the support.

The invention is illustrated in the accompanying drawing, in which—

Figure 1 is a fragmentary sectional view of the rear portion of an automobile showing a lid support made in accordance with my invention applied to the lid thereof and indicating in dotted lines how the support holds the lid in raised position;

Fig. 2 is a rear view of the support in extended lid supporting position, related portions of the lid and body being shown in section on the line 2—2 of Fig. 1;

Figs. 3–6 are longitudinal sectional views of the telescoping lid supporting members in different positions throughout a cycle of operation so as to illustrate the action of the pawl and ratchet mechanism;

Fig. 7 is a longitudinal section in a transverse plane on the line 7—7 of Fig. 5 in which the pawl and ratchet parts are shown in lid supporting relation, and Figs. 8 and 9 are cross-sections on the correspondingly numbered lines of Fig. 3.

The same reference numerals are applied to corresponding parts throughout the views.

Referring first mainly to Figs. 1 and 2, the reference numeral 10 designates the luggage compartment of an automobile and 11 its lid or door hinged at 12 to permit raising and lowering the lid. The lid support of my invention comprises two telescoping supporting arms 13 and 14 pivotally attached at 15 and 16, respectively, to the edge portion of the lid and side wall of the luggage compartment 10 as shown, there being brackets 15a and 16a secured to the lid and body to provide the pivot supports. The two arms 13 and 14 are formed from sheet metal bent to channel-shaped cross-section and the two arms are disposed in telescoping relation with the channels opening toward one another, as clearly appears in Figs. 8 and 9. 17 is a two-toothed pawl mounted for oscillation on the web 18 of the arm 13 on a stud 19. A spring washer 20 (Figs. 7 and 9) under the head of the stud 19 imposes sufficient frictional drag upon the oscillation of the pawl 17 to insure it staying in one position until forcibly moved to another. One tooth 21 of the pawl is formed directly by the apex of one triangular-shaped half of the pawl. The other tooth is provided by a stud 22 projecting at right angles from the apex of the other triangular-shaped half of the pawl. The pivot stud 19 is near the middle of the pawl between the tooth 21 and stud 22. The arm 13 has inturned flanges 23 on the side walls thereof which serve to reenforce the arm while at the same time acting as runners to slide on longitudinal track surfaces 25 along opposite sides of the web 26 next to the side walls 27 of the arm 14. There are longitudinal inturned flanges 28 on the side walls 27 of the arm 14 serving to confine the arm 13 in telescoping relation with the arm 14 as clearly appears in Figs. 8 and 9. The web 26 is formed between dies to provide an embossed channel portion 29 along the upper end of the arm 14 extending nearly its full width through approximately one-third the length of the arm, and then narrowing down abruptly, as indicated at 30, to a narrow channel 31 extending down to the lower end of the arm. A ratchet plate 32 is suitably secured to the web 26 in the upper end of the channel 29 as by rivets 33 and has an offset end portion 34 disposed substantially in the plane of the pawl 17, as indicated in Fig. 7, and formed to provide two laterally spaced notches 35 and 36 in either of which the tooth 21 of the pawl 17 is adapted to engage. A forked cam plate 37 is also secured to the web 26 in the lower end of the channel 29 in spaced relation to the track surface 30 defined by the side of the channel where it narrows down to the channel 31. The plate 37 is fastened by rivets 38 to the web 26 and its upper end is formed to provide the crotch or notch 39, whereas the lower end tapers to a point, as indicated at 40. The plate 37 is disposed in the path of movement of the stud 22 on the pawl 17. In other words, the ratchet plate 32 cooperates with the tooth 21, whereas the cam plate 37 cooperates with the stud 22. It will also presently appear that the stud 22 is, to a certain extent, guided by engagement with the cam surface 30 afforded by one side of the lower end of channel 29.

In operation, at the start of a cycle when the lid 11 is being raised the arms 13 and 14 are in the position shown in Fig. 3 with the stud 22 on the pawl 17 engaged in the narrow channel 31 and, therefore, free to pass the left side of the cam plate 37 in the movement of the pawl upwardly with the arm 13. The tooth 21 on the pawl encounters the inclined side 36a of the notch 36 in the ratchet plate 32 near the end of the upward travel, as indicated in dotted lines in Fig. 4, causing the pawl to turn through a small angularity in a counterclockwise direction to the full line position shown in Fig. 4, where the tooth 21 is fully engaged in the notch 36 and prevents further upward movement of the lid 11. In this slight indexing movement of the pawl the stud 22 has been moved to the right far enough to engage the inclined side 39a of the notch 39 on the return movement of the arm 13 when the lid 11 is released or lowered. In the return movement the stud 22 riding on the inclined surface 39a indexes the pawl 17 again through a slight angularity in a counter-clockwise direction to the position shown in Fig. 5 where the tooth 21 is in a position slightly to the left hand side of the tapered tooth 41 defined between notches 35 and 36. With the stud 22 engaged in the crotch 39, as in Fig. 5, the arm 13 is rigidly supported in coextensive relation with the arm 14 and the lid 11 is accordingly securely supported against accidental dropping. The crotch 39 is deep enough to eliminate any likelihood of the stud 22 being accidentally disengaged from the crotch by reason of the operator accidentally brushing against and raising the lid slightly, as for example, while he is taking things out of the luggage compartment or is loading something therein. In other words, "hair trigger" action is eliminated and the support is rendered thoroughly practical and safe. When the lid is to be lowered the operator simply raises it as far as it will go and in this operation the tooth 21 on the pawl 17 first encounters the inclined side 35a of the notch 35 and again indexes the pawl through another small angle in a counterclockwise direction to the position shown in Fig. 6, where the stud 22 is completely to the right of the cam plate 37 and, therefore, free to pass said plate on return movement of the arm 13 in the lowering or dropping of the lid to closed position. The full engagement of the tooth 21 in the notch 35 limits the raising of the lid similarly as in the previous engagement of said tooth in the notch 36. The operator soon becomes accustomed to raising the lid as far as it will go so that there will be no question about the positive operation of the lid support. In the lowering or dropping of the lid to closed position the stud 22 after passing the right side of the cam plate 37 rides along the inclined cam surface 30 on the arm 14 and indexes the pawl 17 in a clockwise direction back to its starting position as indicated in dotted lines in Fig. 6, the stud 22 traveling into and along the channel 31 as the lid closes and ultimately reaching the position shown in Fig. 3, ready for the next cycle. Even before the lid has been lowered all of the way to closed position, the operator may, if he so desires, raise it and have it supported by the lid support in one up and down movement, because as soon as the stud 22 has traveled part way along the inclined surface 30 toward the channel 31 the stud will find its way around the left side of the cam plate 37 in the upward movement of the lid by riding along the inclined left side of the pointed lower end 40 of the plate. This is an important advantage because frequently one is apt to start to close the luggage compartment and then find that he wants to put something else into or take something out of the luggage compartment and under those circumstances it would be annoying to have to go through the useless operation of lowering the lid all of the way to closed position before raising it again to the open position where the lid support will support it. The pawl 17 in each cycle of operation is indexed through about 45° in a counterclockwise direction in three successive stages, that is, from the position of Fig. 3 to that of Fig. 4, and then to that of Fig. 5 and thereafter to that of Fig. 6, after which it is returned by clockwise movement in one step, namely, from the full position of Fig. 6 to the dotted line position in that figure, which corresponds to the full line position of Fig. 3. The outer end 31a of the narrow channel 31 is shown open (see Fig. 3) to permit entering the stud 22 in the assembling of the support.

The present lid support is of advantage over certain other designs of lid supports in having the pawl and ratchet escapement mechanism substantially completely enclosed in the telescoping arms 13 and 14 so that nothing is apt to come in contact with the moving parts and be damaged thereby or cause damage to the lid support and possibly interfere with its operation. The fact that the moving parts are all enclosed permits lubrication thereof and usually one application of graphite or some heavy lubricant at the time of assembly of the support will serve to keep the support operating smoothly and quietly indefinitely.

It is believed the foregoing description conveys a good understanding of the objects and advantages of my invention. The appended claims have been drawn with a view to covering all legitimate modifications and adaptations.

I claim:

1. A support for a hinged lid or the like comprising two relatively slidable telescoping arms adapted to be connected one to the lid and the other to the receptacle to be closed thereby, a pawl pivotally mounted intermediate its ends on one of said arms providing a tooth on one end and carrying a projecting stud on the other end, a ratchet plate and a cam plate in longitudinally spaced relation on the other arm to be engaged by the tooth and stud, respectively, in successive longitudinal movements of said arms relative to one another, the ratchet plate having two V-shaped notches provided therein in which the tooth of the pawl is engageable alternately in the upward movements of the arm associated therewith, said cam plate having a V-shaped notch provided therein in which the stud on said pawl is adapted to engage in alternate downward movements, one side of one notch in the ratchet plate being slidably engageable by the tooth of the pawl in an upward movement to position the stud for engagement in the notch in the cam plate in the next downward movement, one side of the cam plate notch being slidably engageable by the stud of the pawl in said downward movement to position the tooth for engagement in the other notch of the ratchet plate in the next upward movement, and one side of the last-named ratchet plate notch being slidably engageable by the tooth of the pawl in said upward movement to position the stud for passing the cam plate in the final downward movement, and cam means on the same arm with the ratchet and cam plates adapted to engage the stud in the final downward movement of the pawl carrying arm to return the pawl to the starting position for the next cycle.

2. A support for a hinged lid or the like comprising two relatively slidable telescoping arms adapted to be pivotally connected one to a lid and the other to a receptacle to be closed thereby, a pawl pivotally mounted intermediate its ends on one of said arms on that side toward the other arm and having a tooth formed on one end thereof, and a stud projecting from the other end thereof toward the other arm, said other arm having an elongated recessed portion in one end thereof receiving said stud of substantially uniform width but tapered at its inner end and communicating with an elongated narrower recess in longitudinal alignment with one side of the first recess extending substantially the rest of the length of said arm and also adapted to receive said stud, a ratchet plate carried on said arm in the outer end of said first recess and having an offset portion disposed substantially in the plane of the pawl and formed to provide two laterally spaced notches for engagement therein of the tooth on said pawl in different positions of the pawl, and a second plate disposed in the first recess in longitudinally spaced relation to the ratchet plate in a plane in spaced parallel relation to the plane of the pawl and adapted for engagement only by the stud on said pawl and having a notch on that end thereof toward the ratchet plate to receive said stud in one position of the pawl, said stud being adapted to ride along the tapered end of the first recess into the narrower second recess in the final contracting movement of the pawl carrying arm so as to return the pawl to the starting position for the next cycle of back and forth movements between the ratchet plate and second plate 3. A support as set forth in claim 2 wherein the second plate has the end remote from the notched end tapered to a point.

4. A support as set forth in claim 2 wherein the second plate has at least that side toward the narrower recess formed with an inclined cam surface on that end remote from the notch adapted to have sliding engagement with the stud on the pawl in extension movement of the pawl carrying arm relative to the plate to guide the stud around said plate.

5. A support as set forth in claim 2 wherein one side of each of the notches in the ratchet plate and one side of the notch in the second plate is so inclined in relation to the longitudinal movements of the pawl carrying arm whereby the tooth on the pawl is adapted by sliding engagement with the surfaces on the ratchet plate to index the pawl relative to the second plate and whereby the stud on the pawl by sliding engagement with the surfaces on the ratchet plate second plate is adapted to index the pawl relative to the ratchet plate.

6. A support as set forth in claim 2 wherein the narrow recess is extended to the end of the arm to permit entry of the stud therein in assembling the support.

7. In a lid support comprising two relatively movable arms, one of which is adapted to be pivotally connected to a lid and the other to a receptacle to be closed thereby, a pawl and ratchet escapement mechanism for detachably locking said arms in coextensive lid supporting relation comprising an elongated pawl pivoted intermediate its ends on one of said arms for oscillatory movement and having a pointed tooth on one end and a transverse projection on the other end, means on the other arm providing a projecting portion extending toward the toothed end of the pawl for abutment therewith, said projecting portion provided with two V-shaped notches into which the pointed toothed end of the pawl is engageable alternately in successive relative movements of the arms, other means on the same arm with the last mentioned portion, in longitudinally spaced relation to the first projecting portion and with its notch opening toward the notches of the first projecting portion, both projecting portions being disposed in a plane parallel to the plane of the pawl, one side of one of the notches being slidably engageable by the tooth of the pawl in an upward movement to position the stud for engagement in the notch in the other projecting portion in the next downward movement, one side of the latter notch being engageable by the stud of the pawl in said downward movement to position the tooth for engagement in the other notch of the first-mentioned projecting portion in the next upward movement, and one side of the latter notch being slidably engageable by the tooth of the pawl in said upward movement to position the stud to pass the other projecting portion in the final downward movement, and means providing a cam surface on the same arm with said projecting portions in longitudinally spaced relation to the second projecting portion remote from the first plate and adapted to have sliding engagement with the transverse projection on the pawl at the end of a cycle of relative movements between the arms to return the pawl to a starting position ready for the next cycle.

8. A support as set forth in claim 7 wherein the second projecting portion has a cam surface on the opposite side thereof from the last named cam surface on that end of said projecting portion remote from the notch and adapted to have sliding engagement with the transverse projection on the pawl.

9. A support as set forth in claim 7 wherein the end of the second projecting portion remote from the notch has one side thereof formed to provide a cam surface similarly inclined as the last mentioned cam surface, and wherein the other side of said projecting portion is formed to provide a cam surface oppositely inclined, the two cam surfaces intersecting to form a pointed end on said projecting portion remote from the notch.

10. A support as set forth in claim 7 wherein one side of each of the notches in the first projecting portion and one side of the notch in the second projecting portion is so inclined in relation to the direction of movement of the pawl relative thereto in the relative movement of the arms whereby the tooth on the pawl upon sliding engagement with said inclined sides of the notches in the first projecting portion causes indexing movement of the pawl relative to the second projecting portion and whereby sliding engagement of the transverse projection on the pawl with the inclined side of the notch in the second projecting portion causes indexing movement of the pawl relative to the first projecting portion.

HAROLD E. VAN VOORHEES.

CERTIFICATE OF CORRECTION.

Patent No. 2,229,615.  January 21, 1941.

HAROLD E. VAN VOORHEES.

It is hereby certified that error appears in the printed specification of the above numbered patent requiring correction as follows: Page 3, second column, line 4, claim 5, for "surfaces on the ratchet plate" read --inclined surface on the--; line 28, claim 7, after "mentioned" insert --means providing a notched projecting--; line 51, same claim 7, for the word "plate" read --projecting portion--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.